(12) United States Patent
Simons

(10) Patent No.: US 6,514,462 B1
(45) Date of Patent: Feb. 4, 2003

(54) TIME-TEMPERATURE INDICATOR DEVICES

(75) Inventor: Michael John Simons, Ruislip (GB)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/176,573

(22) Filed: Oct. 21, 1998

(30) Foreign Application Priority Data

Jan. 20, 1998 (GB) .............................. 9801138

(51) Int. Cl.⁷ ................................ G01K 3/04
(52) U.S. Cl. .................. 422/82.12; 422/50; 422/55; 116/206; 116/207; 116/216; 374/106; 374/162; 427/2.13
(58) Field of Search .............. 422/50, 55, 82.12; 116/216, 206, 207; 374/106, 162; 427/2.13

(56) References Cited

U.S. PATENT DOCUMENTS 4,212,153 A 7/1980 Kydonieus et al.
5,053,339 A * 10/1991 Patel .............................. 436/2
5,057,434 A 10/1991 Prusik et al.
5,476,792 A 12/1995 Ezrielev et al.
5,699,326 A * 12/1997 Haas et al. .................. 368/327
6,214,623 B1 * 4/2001 Simons et al. .............. 116/207

FOREIGN PATENT DOCUMENTS

EP 0 203 776 A 12/1986
WO 92 09870 A 6/1992

* cited by examiner

Primary Examiner—Jill Warden
Assistant Examiner—Monique T. Cole
(74) Attorney, Agent, or Firm—Stephen H. Shaw

(57) ABSTRACT

A time-temperature indicator device comprises a polymeric layer having a first and second surface and a dye composition adhered to said first surface comprising a dye which diffuses into the polymeric layer as a result of a cumulative time-temperature exposure wherein the polymeric layer is formed from a natural or synthetic rubber polymer or copolymer. The device may be attached to a product for monitoring cumulative time-temperature exposure.

13 Claims, 1 Drawing Sheet

TIME-TEMPERATURE INDICATOR DEVICES

CROSS REFERENCE TO RELATED APPLICATIONS

The invention claims priority of British Patent Application No. 9801138.0, filed Jan. 20, 1998, titled "Time-Temperature Indicator Devices," by Michael J. Simons.

FIELD OF THE INVENTION

The invention relates to time-temperature indicator devices.

BACKGROUND OF THE INVENTION

Time-temperature indicator devices provide a way of indicating a cumulative time-temperature exposure. A device may be capable of indicating whether a commodity has been exposed to a temperature greater than a predetermined temperature for a period of time. For example, a device might indicate exposure to an excessive temperature for an excessive time or exposure to an adequate temperature for an adequate time.

Various types of time-temperature indicator devices have been disclosed.

U.S. Pat. No. 4,212,153 discloses a time indicator device in which molecular migration of a dye or other agent from one surface of a polymeric indicator layer to the other causes a visible change after a defined time. The indicators exemplified make use of plasticized polyvinyl chloride as the polymeric material. Examples are shown where the rate of appearance of dye color is accelerated by higher temperatures.

U.S. Pat. No. 5,057,434 describes an integrated time-temperature indicator device comprising a system of printable multilayer compatible compositions including (i) a layer of a first composition (a) which develops a first color change as a result of a cumulative time-temperature exposure; (ii) a composition (b) that is capable of melting at a predetermined temperature; and (iii) a composition (c) capable of producing a second color change only as a result of the melting of composition (b) and wherein said second color change is combined with the first color change to yield an integrated color change result.

U.S. Pat. No. 5,476,792 discloses a time-temperature indicator device for recording the duration of time over which a temperature has been established above a predetermined temperature. The device includes a dye-compatible polymer composition having a softening point above the predetermined temperature and a polymer-compatible dye composition in contact with the polymer composition and present in a quantity sufficient for diffusion through the polymer composition whenever it is above the predetermined temperature. The quantity of dye is selected so that the extent of diffusion corresponds to the duration of exposure above the predetermined temperature relative to the total time required for substantially complete diffusion. The devices exemplified are suitable for providing a heat history for medical instruments subjected to high temperature sterilisation.

SUMMARY OF THE INVENTION

The present invention is directed to overcoming one or more of the problems set forth above. Briefly summarised, according to one aspect of the present invention, the invention provides a time-temperature indicator device comprising a polymeric layer having a first and second surface and a dye composition adhered to said first surface comprising a dye which diffuses into the polymeric layer as a result of a cumulative time-temperature exposure wherein the polymeric layer is formed from a natural or synthetic rubber polymer or copolymer.

In another aspect, the invention provides a method of forming a time-temperature indicator device comprising coating a layer of an aqueous emulsion of a natural or synthetic rubber polymer or copolymer on a support, drying the layer and applying to the surface of the layer a dye composition comprising a dye which diffuses into the polymeric layer as a result of a cumulative time-temperature exposure.

A method of monitoring the cumulative time-temperature exposure of a product comprises associating a time-temperature indicator device according to the invention with the product and observing the degree of dye diffusion over a period of time.

These and other aspects, objects, features, and advantages of the present invention will be more clearly understood and appreciated from a review of the following detailed description of the preferred embodiments and appended claims, and by reference to the accompanying drawings.

PROBLEM TO BE SOLVED BY THE INVENTION

Alternative time-temperature indicator devices are desired which are simple to manufacture.

There is a need for devices which can be activated at the point of use without need for appropriate storage before use.

Devices free of plasticizer may be required to avoid the contamination which can result from the leaching of plasticizer.

ADVANTAGEOUS EFFECT OF THE INVENTION

The present invention has the following advantages:

The simplicity of the system makes it inherently easy and low cost to produce;

The activation of the device at the point of use avoids the need for appropriate storage before use; and Devices free of plasticizer can be made.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
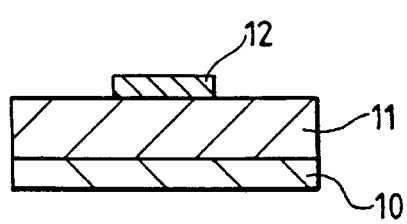
FIG. 1 is a schematic cross section of a device in accordance with the invention.

The invention is characterized in that the polymeric layer through which the dye diffuses comprises a natural or synthetic rubber polymer or copolymer.

The natural or synthetic rubber polymer or copolymer may comprise polymerized diene units selected from butadiene, isoprene and chloroprene.

Suitable polymers and copolymers include vinyl addition compounds including butadiene-styrene copolymers (SBR), acrylonitrile-butadiene copolymers (nitrile rubber), ethylene-propylene-diene (EPDM) rubbers, synthetic polyisoprenes, butyl rubber (copolymers of isobutylene and isoprene), polychloroprene (neoprene), and acrylonitrile and polyacrylate rubbers, or non-vinyl rubbers such as polyurethane rubbers.

The rubbery polymers or copolymers may be used in the unvulcanised or vulcanised (crosslinked) states, and the polymeric layer may be prepared from a latex suspension of the polymer or copolymer. Generally, the rubbery polymers or copolymers of the invention will have a degree of elasticity.

The polymeric layer is critical in determining the temperature range in which the device operates. Rubbers are particularly effective in the lower temperature ranges, for instance latex rubber, as a sheet or as a layer on a support, allows rapid lateral diffusion at room temperature but not at −20° C. Polybutadiene has been found suitable for even lower temperature ranges, polyisoprene (cis) behaves similarly to natural latex rubber, while polyisoprene (trans) is suitable for photographic film temperature indication as a dye mark remains legible for weeks at room temperature but is blurred within 3 hours at 50° C. or 60° C. Copolymers and modified copolymers of styrene and butadiene are suitable for different temperature ranges, depending amongst other things on the styrene:butadiene ratio, higher proportions of styrene requiring higher temperatures before dye diffusion can occur. It is an advantage of the invention that a ready means of altering the time-temperature response of the rubber copolymers is available by adjusting the ratio of monomers from which they are prepared.

Blends of different rubbery polymers or copolymers may allow further control of the thermal diffusion properties.

Preferably, the polymeric layer through which the dye diffuses is non-adhesive.

The polymeric layer may contain additives known in the art, including plasticizers, if desired. It may also contain a substance which melts at a suitable temperature.

The dye is preferably a water-insoluble dye such as a disperse dye or a solvent dye, and sublimable dyes have been found to be very suitable. Sublimable dyes are dyes which can transfer through the vapor phase at temperatures of less than about 250° C. (and normally 100° C.–200° C). Suitable dyes include those used in existing photographic thermal dye transfer products.

Dyes may be chosen from azo dyes, diazo dyes, anthraquinone dyes, carbonyl dyes, polymethine dyes, azomethine dyes, triarylmethane dyes, indoaniline dyes, indophenol dyes, xanthine dyes, oxazine dyes and thiazine dyes.

Examples of suitable dyes include dyes known in The Color Index as solvent dyes, for instance Solvent Green 3 and Solvent Blue 59; dyes known in The Color Index as oil dyes, for instance Oil Red 0; and dyes known in The Color Index as disperse dyes, for instance Disperse Blue 3, and Disperse Orange 13.

Examples of suitable sublimable dyes include the dyes of Example 1 below; anthraquinone dyes, e.g., Sumikalon™ Violet RS (product of Sumitomo Chemical Co., Ltd.). Dianix™ Fast Violet 3R-FS (product of Mitsubishi Chemical Industries, Ltd.). and Kayalon™ Polyol Brilliant Blue N-BGM and KST Black™ 146 (products of Nippon Kayaku Co., Ltd.); azo dyes such as Kayalon™ Polyol Brilliant Blue BM, Kayalon™ Polyol Dark Blue 2BM and KST Black™ KR (products of Nippon Kayaku Co., Ltd.), Sumickaron™ Diazo Black 5G (product of Mitsui Toatsu Chemicals, Inc.); direct dyes such as Direct Dark Green B™ (product of Mitsubishi Chemical Industries, Ltd.) and Direct Brown M™ and Direct Fast Black D™ (products of Nippon Kayaku Co. Ltd.); acid dyes such as Kayanol™ Milling Cyanine 5R (product of Nippon Kayaku Co. Ltd.); basic dyes such as Sumicacryl™ Blue 6G (product of Sumitomo Chemical Co., Ltd.), and Aizen Malachite Green (E) (product of Hodogaya Chemical Co., Ltd.).

Preferably, a combination of polymer and dye is selected such that the dye only migrates above a predetermined temperature. In a preferred embodiment of the invention, the polymeric layer contains a masking agent. Examples of suitable masking agents include inorganic pigments e.g. titanium dioxide, zinc oxide, micaceous pigments, aluminium flakes and organic light-scattering agents such as Ropaque™ dispersions manufactured by Rohm &Haas. In this way, the dye is obscured and does not become visible until it has migrated through the polymer layer.

The second surface of the polymeric layer may be attached to a support. The support is preferably a planar support e.g. in the form of a sheet or film. Suitable support materials include polymeric materials such as polyesters, polycarbonates, polyethylene, polypropylene and cellophane.

The support is preferably transparent.

The time-temperature indicator device may be formed by coating a layer of an aqueous emulsion of a natural or synthetic rubber polymer or copolymer on a support, drying the layer and applying to the surface of the layer a dye composition as described above.

Diffusion of the dye into the polymer causes a detectable change and the cumulative time-temperature exposure of a product may be monitored by associating a time-temperature indicator device according to the invention with the product and observing the degree of dye diffusion over a period of time. The degree of dye diffusion may be detected by visual comparison or by known instrument means for comparing dye densities.

The device may be distinct from the product and attached thereto. For example, it may comprise a label having a polymeric layer to which is applied a mark in dye, the combination of polymeric layer and dye being such that the mark suffers diffusion when held above a certain temperature for a certain time, thus causing a visible change in its appearance. The mark (for instance a date) can for instance be applied to the surface of the label, and excessive time-temperature conditions cause lateral diffusion so it becomes blurred or illegible.

In a preferred embodiment, the polymeric layer is loaded with an obscuring pigment, such as titanium dioxide, a warning message in dye is applied to one side of the polymeric layer, and the time-temperature condition causes the dye to diffuse through the thickness of the layer so that it becomes visible from the other side.

The label may be attached to the commodity which it is monitoring. A convenient form of label comprises a pigmented rubbery layer coated on a transparent support, the dye is applied in the absence of a solvent for the dye to the side of the pigmented rubbery layer furthest from the transparent support, and the label is attached so that the pigmented rubbery layer is viewed through the transparent support. In this way, the dye only becomes visible after diffusing through the pigmented rubbery layer following exposure to temperature and time conditions sufficient to cause the diffusion.

An example of such a label is shown schematically in cross section in FIG. 1. A layer of rubber copolymer 11 containing a masking agent to render it opaque is carried on a transparent polyester film support 10. The outer surface of the rubber copolymer 11 bears a dye mark 12.

The label may be provided with adhesive on the outer surface of the rubbery layer to facilitate attachment to the product. The adhesive e.g. in the form of an adhesive layer, may be covered by a release sheet which would be removed prior to use.

The dye may be applied directly to the surface of the pigmented rubbery layer, either as an aqueous "ink" or dispersion of finely divided solid dye particles, or by the method of flash transfer (as described by Shuttleworth and Simons in Research Disclosure, 1976, 142, pp14–15) if the dye is sublimable.

Alternatively the dye may be applied to a separate carrier sheet by printing or stamping, and, after any solvents for the dye have been allowed to disperse, the pigmented polymeric layer is contacted to the carrier sheet with a rubbery adhesive layer which readily allows the dye to diffuse through it in the temperature regime being monitored.

Figure 2:
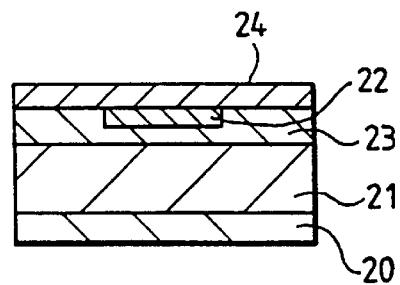
FIG. 2 is a schematic cross section of a device in accordance with the invention.

An example of such a label is shown schematically in cross section in FIG. 2. A layer of rubber copolymer 21 containing a masking agent to render it opaque is carried on a transparent polyester film support 20. The outer surface of layer 21 is covered by a layer of adhesive 23 which will allow dye to diffuse therethrough in use e.g. a rubbery adhesive layer. The outer surface of the adhesive layer is in contact with a paper support 24 bearing a dye mark 22.

In a further embodiment, the dye may be dissolved or dispersed in an aqueous latex dispersion of diffusion-permitting rubbery polymer and the rubber—dye composition used as an ink to print the required warning message or sign, either on the back surface of the label itself, or on the separate carrier sheet to which the back surface of the label is subsequently contacted.

It will be appreciated that the time-temperature indicator device may be an integral part of the product. For example, the dye may be applied to the product e.g. printed on the packaging, and simultaneously or subsequently covered with a layer of the rubber polymer. In this way the dye and polymer can be kept separate until required to fulfil their function in combination and the device is formed at the point of use. In comparison, a device formed prior to use has to be kept under conditions which ensure that there is no premature dye migration until use occurs.

An alternative embodiment of the invention is a device which gives assurance to the user or merchandiser that the product is still good, by displaying a message or mark which disappears when exposed to excessive conditions of time and temperature. The message or mark may be a printed word or words, such as "FRESH", or it may be an encoded message such as a bar code which is optoelectronically scanned. The message or mark is caused to disappear or become unreadable by the growth of an optical density in the areas surrounding the message or mark, so that it can no longer be read or scanned.

In a further embodiment of the invention, the disappearance of the first message or mark may be followed by the appearance of a second message or mark which gives a positive indication that excessive conditions of time and temperature have been experienced, for instance by the appearance of a warning message, such as "EXPIRED". This second message or mark may be in a similar or different color to the first message or mark, and is made by a dye which appears at a slower rate than the dye which causes the obscuring of the first message or mark.

Figure 3A:
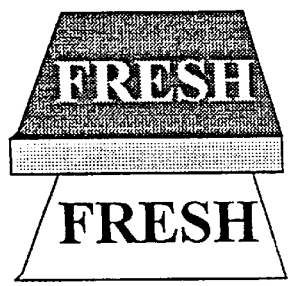
FIGS. 3A and 3B are schematic illustrations of the use of a device in accordance with the invention.
Figure 3B:

In the case of an eye-readable message, the device may be fabricated by printing the message on a viewable surface and printing the same message in a negative sense in or below the time-temperature responsive medium, so that when the time-temperature responsive medium has fully responded to the exposure to temperature over time, the negatively-printed message has appeared to give a substantially uniform optical density in the area of the message. This is illustrated in FIGS. 3A and 3B, which depict the use of devices based on dye diffusion through a rubbery polymer in accordance with the invention. The message "FRESH" is printed on the viewable surface, either in light letters on a dark ground (FIG. 3A), or in dark letters on a light ground (3B). The same message is printed in a negative sense on a lower surface. The ink used comprises a diffusible dye, and between this message and the viewable surface is applied a layer of pigment-filled rubbery polymer which obscures the message on the lower surface. When the device is maintained at a temperature to which it responds, the diffusible dye diffuses through the polymer and eventually gives an equal and opposite density at the viewable surface such that the message can no longer be read.

Figure 4:
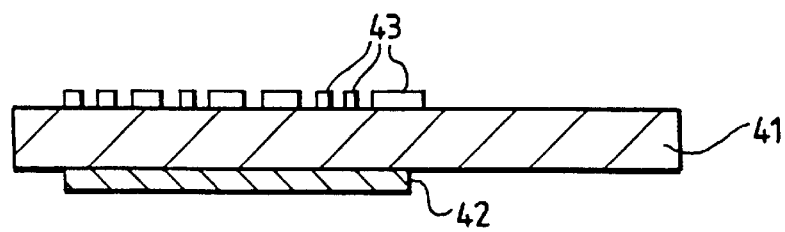
FIG. 4 is a schematic cross section of a device in accordance with the invention.

In the case of a machine-read mark, such as a bar code, the device may be fabricated by printing the mark or code on a viewable surface and providing the means for a uniform growth of optical density at the viewable surface of the time-temperature responsive medium, so that when the time-tempterature responsive medium has fully responded to the exposure to temperature over time, the optical contrast of the mark or code has been decreased sufficiently to make it unreadable by the machine. This is illustrated in FIG. 4, which depicts the use of a device based on dye diffusion through a rubbery polymer in accordance with the invention. A bar code 43 is printed on the viewable surface of a pigment-filled rubbery polymer layer 41, as dark bars on a light ground. The pigment-filled rubbery polymer layer is applied or printed above a layer or patch 42 of diffusible dye which absorbs light in wavelengths to which the optoelectronic reading or scanning device is sensitive. When the device is exposed to a temperature above the critical point, the diffusible dye starts to diffuse and when sufficient time has elapsed, the resultant darkening of the background against which the bar code is printed causes the bar code to become unreadable.

The sensitivity of the system is controlled primarily by the polymeric layer, but the precise nature of the dye also has an effect, depending on the polymeric layer used. The sensitivity may also be controlled (or fine-tuned) by the dimensions of the mark, as a visible difference will be seen earlier if the spacing between elements of the mark is smaller rather than larger, since less diffusion is required to change the appearance of the mark. Patterns of dots may be particularly sensitive.

Labels according to the invention may be used for refrigerated or frozen food, to show if it has been kept for a period at higher than desirable temperatures, or for example for photographic film, which deteriorates if kept at unduly high temperatures. The choice of polymer and dye determines the temperature-time regime in which the label operates.

It is a particularly useful feature of the invention that for low temperature regimes, the mark may be applied at the point and time of use, so that there is no need to store the temperature-time indicator at low temperatures: before the mark is applied, the system is not sensitive, and has a long shelf life at room temperature.

In another application, the device may be used to verify that a sufficient heat treatment (e.g. cooking) has been given. In this case, it may be preferable to arrange the device so that the dye diffuses through the thickness of a pigmented polymeric layer so that a color or message (e.g. COOKED) appears on its top surface when the required time-temperature conditions have been met.

There is a very large potential market for labels to warn against improper thermal storage conditions: photographic materials, foodstuffs, pharmaceuticals, vaccines and batteries, for instance.

The invention is further illustrated by way of example as follows.

EXAMPLE 1

Three pieces of latex rubber were cut from a rubber glove ("Johnson and Johnson Micro-Touch" latex medical gloves). The words "Best before" were written on each sample with a conventional solvent-based marker pen, and then the date was written on each sample by flash transfer (see below) of the dyes

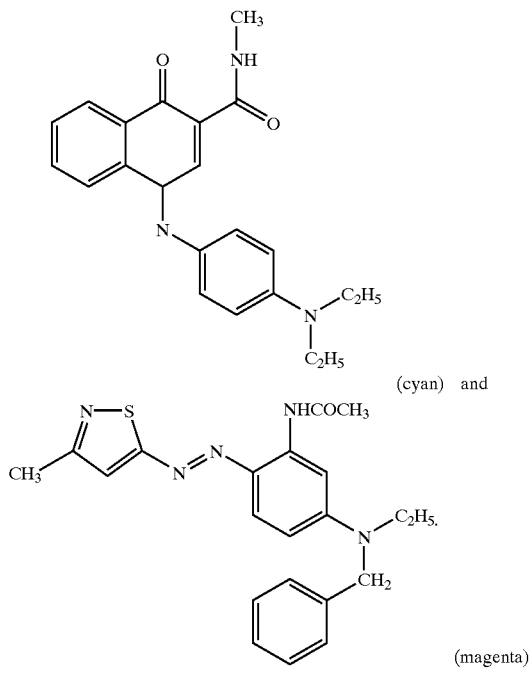

(cyan) and (magenta)

One sample was left at room temperature 21° C., one was put in a refrigerator at 4° C., and the third was put in a freezer at −20° C. After 3 hours, the printed date of the room temperature sample had blurred edges, after 24 hours it was very blurred, and after 4 days it was illegible.

The sample kept at 4° C. showed blurred edges after 24 hours, and after 7 days was very blurred.

The sample kept in the freezer at −20° C. was still sharp after 10 months.

The "Best before" message written in conventional ink remained sharp on all samples.

Flash Transfer Printing

Coatings of sublimable dye with carbon in an ethyl cellulose binder were prepared by dissolving 0.1 g of dye and 0.1 g of ethyl cellulose in 30 ml of 4-methyl-2-pentanone, adding 5 ml of lampblack dispersion and 3 drops of 2% w/w polydimethylsiloxane solution in toluene, and coating on polyester film base with a knife blade set 0.1 mm above the film base. The lampblack dispersion was prepared by dissolving 0.9 g of ethyl cellulose in 60 ml of 4-methyl-2-pentanone, adding 2.4 g of lampblack, and ball-milling (using 5 mm dia. glass balls) overnight.

The coating was placed face down on the polymeric receiving layer, an optical mask showing the date in clear figures on a black ground was placed above the coating and under the window of a photographic flash gun. The gun was fired and it was seen that a pattern of dye corresponding to the date had transferred to the polymeric receiving layer.

EXAMPLE 2

Titanium Dioxide Dispersion

Titanium dioxide ("Tioxide R-CR2"), 60 g, water, 75 g, and 10 wt% sodium tri-isopropyl naphthalene sulphonate solution in water, 1 g, were put in a glass jar together with about 100 g of 5 mm diameter glass beads and the mixture was ball-milled overnight. The result was a smooth white dispersion.

Coating 10 g of the titanium dioxide dispersion was mixed with 20 g of a latex of a carboxylated styrene/butadiene copolymer, type XZ94755.00 supplied by Dow Chemical Company. The latex had 48 wt % solids and the glass transition temperature (Tg) was stated to be −20° C.

The white suspension was coated on polyester film base using a doctor blade spaced approximately 75 micrometers above the film base, and allowed to dry. The result was a smooth opaque white coating.

Dye Dispersions

A dispersion of each of three solvent-soluble dyes was made by ball-milling for 24 hours 0.1 g of dye, 0.02 g of surfactant petronate L (supplied by Witco Co.), 0.1 g of the polyethylene imine Kollidon 17PF (supplied by BASF), and 4.7 g of water, using 1 mm diameter zirconia beads as the milling medium. The dyes were Oil Red O, supplied by Aldrich, and Elbasol Red 2G and Elbasol Blue 2G, supplied by Holliday Dyes and Pigments Ltd.

Test

The dispersions of dye were painted on the surface of the white pigmented coating and allowed to dry. One sample was put in a freezer and one left at room temperature, approximately 21° C. On viewing the samples through the film base (i.e. the side opposite to the applied dye mark) the dye was not initially visible.

After two hours at room temperature, the dyes could clearly be seen through the film base, while no change was visible in the freezer sample. Three months later, there was still no change visible in the freezer sample.

EXAMPLE 3

Titanium Dioxide Dispersion

Titanium dioxide ("Tioxide R-XL"), 60 g, water, 75 g, and 10 wt % sodium tri-isopropyl naphthalene sulphonate solution in water, 1 g, were put in a glass jar together with about 100 g of 5 mm diameter glass beads and the mixture was ball-milled overnight. The result was a smooth white dispersion.

Coating 10 g of the titanium dioxide dispersion was mixed with 20 g of a latex of a carboxylated styrene/butadiene copolymer, type DL395 supplied by Dow Chemical Company. The latex had 50 wt % solids and the glass transition temperature (Tg) was stated to be +10° C.

The white suspension was coated on polyester film base using a doctor blade spaced approximately 75 micrometers above the film base, and allowed to dry. The result was a smooth opaque white coating.

Test

The word EXPIRED, laterally reversed, was written by flash transfer as in Example 1, using the magenta and cyan dyes of Example 1, onto the surface of the white coating.

On viewing the samples through the film base (i.e. the side opposite to the applied dye mark) the dye was not initially visible.

One sample was kept at room temperature (about 21° C.) and one was placed in an oven at 60° C. and 50% relative humidity. After four hours in the oven the word EXPIRED was clearly visible when viewed through the film base. On the other hand, the room temperature sample did not show the word EXPIRED when viewed through the film base after six months keeping.

EXAMPLE 4

The white coating of Example 3 was supercoated with a mixture consisting of 40 g of water and 10 g of carboxylated styrene/butadiene copolymer, type XZ94466.01 supplied by Dow Chemical Company. The latex had 49 wt % solids and the glass transition temperature (Tg) was stated to be −35° C. After drying, the supercoat was tacky to the touch, and was capable of acting as a contact adhesive.

Dye marks were made on a piece of paper card by applying a solution of 0.1 g of dye in 5 ml of acetone using a small paint brush. The dyes used were Sudan Black B, Waxoline Rhodamine BS, Ceres Red 7B, Ceres Violet BRN, and Sudan Red 7B. The marks were allowed to dry thoroughly, and then the white coating with its adhesive supercoat was pressed in contact with the marks on the card, the adhesive being in contact with the dye marks, and the film base of the white coating facing outwards.

Two such assemblies were made, and the dye marks were not visible on viewing through the film base.

One assembly was placed in an oven at 60° C., and after two hours the dye marks were clearly visible on viewing through the film base. The other assembly was maintained at room temperature, and after three months the dye marks were not visible on viewing through the film base.

The invention has been described with reference to a preferred embodiment; However, it will be appreciated that variations and modifications can be effected by a person of ordinary skill in the art without departing from the scope of the invention.

Parts List 10 polyester film support
11 rubber copolymer
12 dye mark
20 polyester film support
21 rubber copolymer
22 dye mark
23 adhesive
24 paper support
41 rubbery polymer layer
42 layer or patch
43 bar code

What is claimed is:

1. A time-temperature indicator device comprising:
a non-adhesive polymeric layer having a first and a second surface and being formed from a natural synthetic rubber polymer or copolymer comprising polymerised diene units, the non-adhesive polymeric layer containing a masking agent thereby rendering said polymeric layer opaque;
a dye composition adhered to said first surface comprising a water-insoluble dye arranged such that as a result of a cumulative time-temperature exposure said dye composition diffuses through said non-adhesive polymeric layer, the masking agent obscuring the dye until it has migrated through the non-adhesive polymeric layer; and,
a transparent support layer arranged to carry said non-adhesive polymer layer to facilitate visualization of the dye composition upon sufficient time-temperature exposure.

2. A device according to claim 1 wherein the polymer or copolymer comprises polymerised diene units selected from butadiene, isoprene and chloroprene.

3. A device according to claim 1 wherein the polymer or copolymer is selected from the group consisting of butadiene-styrene rubbers, acrylonitrile-butadiene rubbers, ethylene-propylene-diene rubbers, polyisoprene rubbers, isobutylene-isoprene rubbers and styrene-isoprene rubbers.

4. A device according to claim 1 wherein the dye is a solvent-soluble or sublimable dye.

5. A device according to claim 1 wherein the dye is selected from the group consisting of azo dyes, diazo dyes, anthraquinone dyes, carbonyl dyes, polymethine dyes, azomethine dyes, triarylmethane dyes, indoaniline dyes, indophenol dyes, xanthine dyes, oxazine dyes and thiazine dyes.

6. A device according to claim 1 wherein the second surface of the polymeric layer is attached to a support.

7. A method of forming a time-temperature indicator comprising the steps of:
coating a layer of an aqueous emulsion of a natural or synthetic rubber polymer or copolymer comprising polymerised diene units on a transparent support, the layer including a masking agent thereby rendering the layer opaque;
drying the layer to form a non-adhesive polymeric layer and applying to the surface of the polymeric non-adhesive layer a dye composition comprising a water-insoluble dye arranged such that as a result of a cumulative time-temperature exposure said dye composition diffuses through the non-adhesive polymeric layer, the masking agent obscuring the dye until it has migrated through the non-adhesive polymeric layer.

8. A method according to claim 7 wherein the polymer or copolymer comprises polymerised diene units selected from butadiene, isoprene and chloroprene.

9. A method according to claim 7 wherein the polymer or copolymer is selected from the group consisting of butadiene-styrene rubbers, acrylonitrile-butadiene rubbers, ethylene-propylene-diene rubbers, polyisoprene rubbers, isobutylene-isoprene rubbers and styrene-isoprene rubbers.

10. A method according to claims 7 wherein the dye is a solvent-soluble or sublimable dye.

11. A method according to claim 7 wherein the dye is selected from the group consisting of azo dyes, diazo dyes, anthraquinone dyes, carbonyl dyes, polymethine dyes, azomethine dyes, triarylmethane dyes, indoaniline dyes, indophenol dyes, xanthine dyes, oxazine dyes and thiazine dyes.

12. A method of monitoring the cumulative time-temperature exposure of a product which comprises associating a time-temperature indicator device according to claim 1 with the product and observing the degree of dye diffusion over a period of time.

13. A method according to claim 12 wherein the product includes the time-temperature indicator device.

* * * * *

UNITED STATES PATENT AND TRADEMARK OFFICE
CERTIFICATE OF CORRECTION

PATENT NO.    : 6,514,462 B1   Page 1 of 1
DATED         : February 4, 2003
INVENTOR(S)   : Michael John Simons It is certified that error appears in the above-identified patent and that said Letters Patent is hereby corrected as shown below:

<u>Title page,</u>
Insert Item [*], Notice, after Item [73] and before Item [21],
-- This patent issued on a continued prosecution application filed under 37 CFR 1.53(d), and is subject to the twenty year patent term provisions of 35 U.S.C. 154(a)(2).
   This patent is subject to a terminal disclaimer. --.

Signed and Sealed this

Twenty-fourth Day of June, 2003

JAMES E. ROGAN
*Director of the United States Patent and Trademark Office*